(12) United States Patent
Phan et al.

(10) Patent No.: US 11,319,798 B1
(45) Date of Patent: May 3, 2022

(54) ADVANCED COATINGS FOR DOWNHOLE APPLICATIONS

(71) Applicant: Halliburton Energy Services, Inc., Houston, TX (US)

(72) Inventors: Anthony Phan, Carrollton, TX (US); Celso Max Trujillo, Jr., Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/088,876

(22) Filed: Nov. 4, 2020

(51) Int. Cl.
*E21B 47/07* (2012.01)
*E21B 12/02* (2006.01)

(52) U.S. Cl.
CPC .............. *E21B 47/07* (2020.05); *E21B 12/02* (2013.01)

(58) Field of Classification Search
CPC .................................. E21B 47/07; E21B 12/02
See application file for complete search history.

(56) References Cited

U.S. PATENT DOCUMENTS

| | | | | |
|---|---|---|---|---|
| 3,002,385 A * | 10/1961 | Wahl | ........................ | C09D 5/26 374/106 |
| 3,260,111 A * | 7/1966 | Godbey | .................. | G01K 11/06 374/104 |
| 3,260,112 A * | 7/1966 | Godbey | .................. | G01K 11/06 374/104 |
| 3,802,269 A | 4/1974 | Cooper | | |
| 4,483,393 A * | 11/1984 | More | ..................... | E21B 17/003 166/65.1 |
| 4,561,300 A | 12/1985 | O'Brien | | |
| 6,488,992 B1 | 12/2002 | Boerio et al. | | |
| 6,706,218 B2 | 3/2004 | Lucht et al. | | |
| 2007/0051510 A1 | 3/2007 | Veneruso et al. | | |
| 2010/0018778 A1 * | 1/2010 | Nanayakkara | .......... | C08L 21/00 175/371 |
| 2010/0091288 A1 * | 4/2010 | DiFoggio | ............. | G01N 21/783 356/436 |
| 2015/0330843 A1 | 11/2015 | Bodley | | |
| 2016/0053572 A1 | 2/2016 | Snoswell | | |
| 2018/0320474 A1 | 11/2018 | Clemens et al. | | |
| 2021/0340866 A1 * | 11/2021 | Zhan | ....................... | E21B 47/06 |

OTHER PUBLICATIONS

Great Britain Search Report and Written Opinion for Application No. GB2018726.6, dated Jul. 2, 2021.
Halliburton, Completion Solutions, Evo-Trieve and Evo-Trieve HP Bridge Plugs, H06439, 2020.

* cited by examiner

*Primary Examiner* — Shane Bomar
(74) *Attorney, Agent, or Firm* — Scott Richardson; C. Tumey Law Group PLLC

(57) ABSTRACT

A diagnostic coating is applied to the surface of a wellbore service tool. The diagnostic coating has one or more constituents that undergoes an optically-detectable physical change responsive to changing values of one or more downhole parameters. After exposing the diagnostic coating of the service tool to the downhole environment, the tool may be retrieved from the wellbore and inspected to detect any physical change indicative of the service tool having been exposed to elevated values of the one or more downhole parameters.

20 Claims, 5 Drawing Sheets

FIG.5

| Tool1 Service Life (hr) | Component1 Service Life (hr) | Tool2 Service Life (hr) | Component2 Service Life (hr) | Temp (F) |
|---|---|---|---|---|
| 10000 | 100 | 10000 | 100 | 100 |
| 10000 | 99 | 10000 | 97 | 150 |
| 10000 | 97 | 10000 | 91 | 200 |
| 9950 | 94 | 9900 | 82 | 250 |
| 9950 | 90 | 9900 | 70 | 300 |
| 9950 | 85 | 9900 | 55 | 350 |
| 9800 | 79 | 9600 | 38 | 400 |
| 9800 | 72 | 9600 | 17 | 450 |
| 9800 | 64 | 9600 | 5 | 500 |
| 9500 | 55 | 7000 | X | 550 |
| 9000 | 45 | 6000 | X | 600 |

| Downhole Parameters ($P_1$ - $P_N$) | | | | | | |
|---|---|---|---|---|---|---|
| ... | Pressure | $Chem_1$ | $Chem_2$ | Flow | ... | $P_N$ |
| | | | | | | |
| | | | | | | |
| | | | | | | |
| | | | | | | |
| | | | | | | |
| | | | | | | |
| | | | | | | |
| | | | | | | |
| | | | | | | |
| | | | | | | |

FIG.3

ADVANCED COATINGS FOR DOWNHOLE APPLICATIONS

BACKGROUND

Wells are constructed for the potential recovery of hydrocarbons such as oil and gas from underground formations. Typically, a well is drilled with a tubular drill string that is progressively assembled to reach the desired well depth. A casing string may then be lowered into selected portions of the wellbore and cemented in place to reinforce the wellbore. The casing may be perforated at selected intervals to provide flowpaths for extracting hydrocarbon fluids from a production zone(s) of the formation. The formation may also be stimulated such as by hydraulically fracturing or acidizing the formation in the vicinity of the production zone. Finally, a production tubing string may be run into the well to the production zone, protecting the casing and providing a flow path to a wellhead through which the oil and gas can be produced.

Each of the phases of well construction may be costly and labor-intensive. One aspect of the cost is the challenge of working in a harsh downhole environment, which may expose tools to high temperatures, pressures, forces, and a multitude of potentially corrosive or reactive working fluids and formation fluids. Tools and methods must be designed and built to withstand the harsh downhole environment. A tool is often required to be run in multiple trips into a single well. Some tools are used repeatedly as part of a fleet and are maintained with the expectation that they function reliably over the life of many wells.

BRIEF DESCRIPTION OF THE DRAWINGS

These drawings illustrate certain aspects of some of the embodiments of the present disclosure and should not be used to limit or define the disclosure.

FIG. 3 is a chart hypothetically relating the service lives of two example tools and their components based on different downhole parameters.

DETAILED DESCRIPTION

Figure 1:
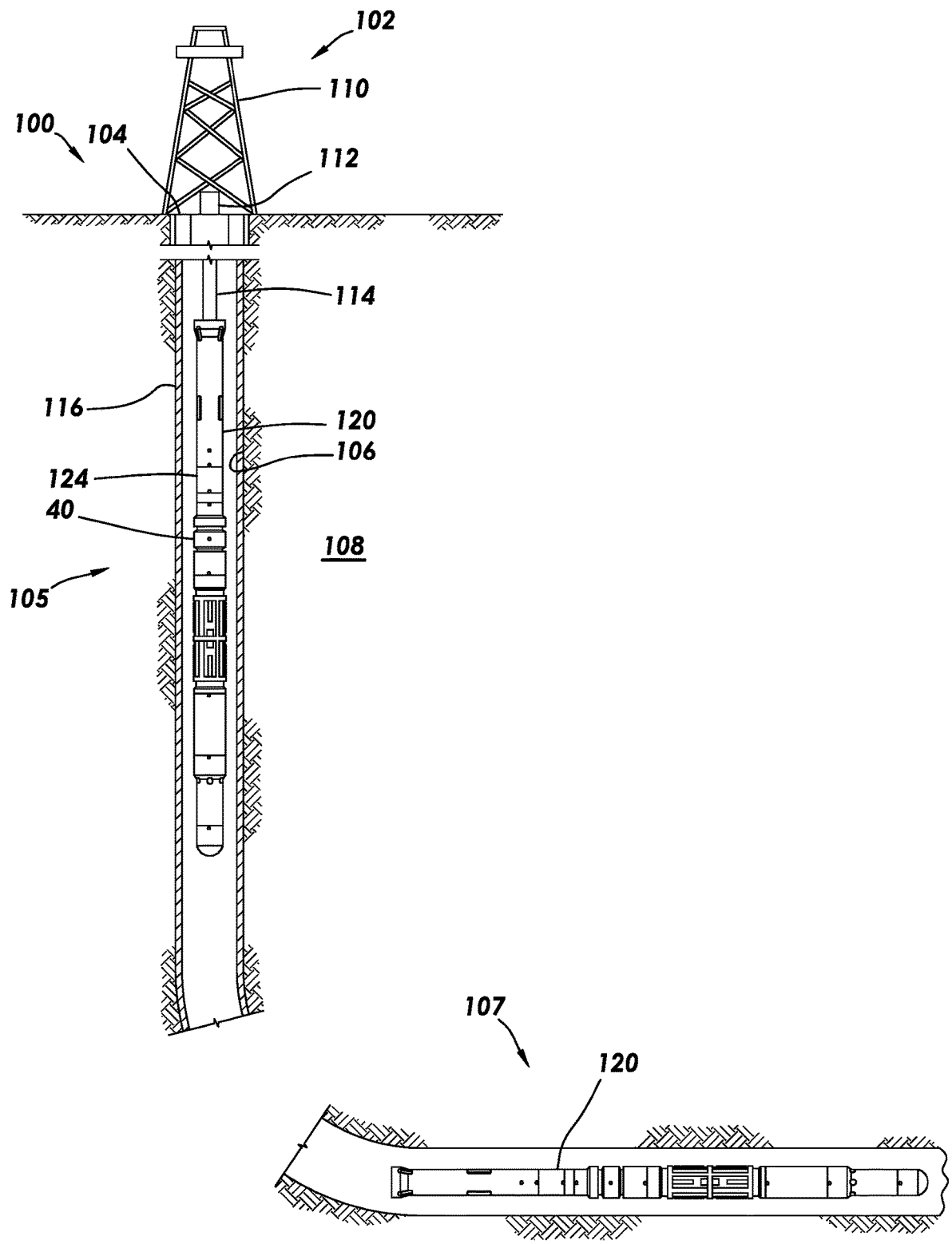
FIG. 1 is a schematic, elevation view of a well system in which a wellbore service tool having a diagnostic coating may be deployed in a well and later retrieved for inspection.

Disclosed herein are wellbore service tools and, particularly, disclosed are wellbore service tools with a diagnostic coating and associated methods. A diagnostic coating applied to a wellbore service tool or component thereof undergoes an optically detectable physical change (e.g. color change) responsive to one or more downhole parameters, to provide a visual diagnostic assessment about the wellbore environment when the tool is retrieved. The coating may indicate, for example, that a component has reached or exceeded a maximum design temperature, has been exposed to a specific chemical or substance, or other such downhole parameter that may affect the service life of the tool or a component thereof. The diagnostic coating allows this determination to be readily made, such as in the field, in some cases simply by viewing the coating or optically analyzing the coating with a machine. Physical changes to the diagnostic coating resulting from particular parameters of the downhole environment will convey important diagnostic information, such as to determine the quality of service, to help diagnose the cause of a tool failure, or to proactively identify and avoid re-using a tool that may have been compromised by exposure to a wellbore environment in excess of the design parameters for the tool or component.

The diagnostic coating may be formulated with one or more "active" constituents, each undergoing an optically-detectable physical change responsive to a different parameter of the downhole environment. The active constituents at least include a thermochromic constituent responsive to elevated downhole temperature (temperature above a selected threshold) or to temperatures within a predefined temperature change known to degrade or otherwise affect the expected service life of the tool or a component. Other active constituents in the diagnostic coating may be responsive to the presence or intensity of other parameters, such as the presence or concentration of specific chemicals. The coating may also include one or more other constituents, which may be considered "inactive" if they serve some other function other than to provide an optically-detectable physical change responsive to parameters of the downhole environment. For instance, constituents of the coating may be included to positively identify key components on the tool (e.g. a particular starting color or color range), enhance chemical and abrasion resistance, and reduce friction to improve retrievability.

The coating may be applied by encapsulation and/or embedment methods. In some examples as per discussion below, the diagnostic coating may be applied to the surface of a specific component, such as a sealing element or electronic component. The coating may be applied to a surface exposed directly to the downhole environment, such as an exterior sealing element. The coating may alternatively be applied to a surface that is isolated from direct exposure to the downhole environment while still being subjected to one or more other downhole parameter such as temperature. For instance, the coating may be applied to an interior surface within a cavity of the tool body. The cavity may be any cavity within a tool body to which a diagnostic coating may be applied. In one example, the cavity may comprise a sealed chamber in which to place a removeable diagnostic specimen having the diagnostic coating, such that the diagnostic surface may be accessed and inspected after retrieving the tool from the well. All of these aspects are discussed further below with respect to the figures and examples.

FIG. 1 is a schematic, elevation view of an example of a well system 100 in which one or more wellbore service tool ("tool") 120 having a diagnostic coating according to this disclosure may be deployed in a well and later retrieved for inspection. The tool 120 may be used in any given wellbore service either when constructing the well or servicing an existing well. The tools 120 in FIG. 1 are drawn as bridge plugs by way of example, though the diagnostic coating to be discussed may be applied to components of any wellbore service tool.

The well system 100 includes an oil and gas rig 102 with a derrick 110 erected over the earth's surface 104 above a rig floor 112. FIG. 1 shows a land-based oil and gas rig 102, but aspects of the present disclosure are useful with other types of rigs, such as offshore platforms or floating rigs used for subsea wells. The wellbore 106 may be at least partially cased with a casing string 116. The wellbore 106 may deviate below ground and follow any desired wellbore path, from a vertical section 105 extending from the earth's surface 104 to a horizontal or lateral section 107 deep below the earth's surface 104. (The wellbore path is truncated in FIG. 1 for ease of illustration.) Unless otherwise specified, the term uphole generally refers to a direction along the wellbore path toward the surface 104 and the term downhole generally refers to a direction along the wellbore path toward the end of the well. By this convention, the vertical section 105 may be said to be uphole of the lateral section 107, and vice-versa.

The rig 102 may include a hoisting apparatus 108 for raising and lowering equipment from the rig 102 on a conveyance 114. The conveyance 114 may comprise a tubular string, coiled tubing, wireline, slickline, or any combination of the foregoing. The conveyance 114 may convey fluids and support electrical communication, power, and fluid transmission to the service tools 120 during wellbore operations. The conveyance 114 may be used to lower the service tools 120 into the wellbore 106 prior to service. The conveyance may then retrieve the service tools 120 when a wellbore operation is complete, or when it becomes necessary to inspect, maintain, or replace them. The service tools 120 are illustrated as bridge plugs in this example, and a setting tool (not shown) carried on the conveyance 114 may be used to seat the bridge plugs at selected locations within the wellbore 106. As further discussed below, a diagnostic coating is applied to the service tool, or to one or more components thereof. For example, in FIG. 1, the diagnostic coating may be applied directly to a metal body 124 of the tools 120 or specifically to an elastomeric seal 40 thereon.

Figure 2:
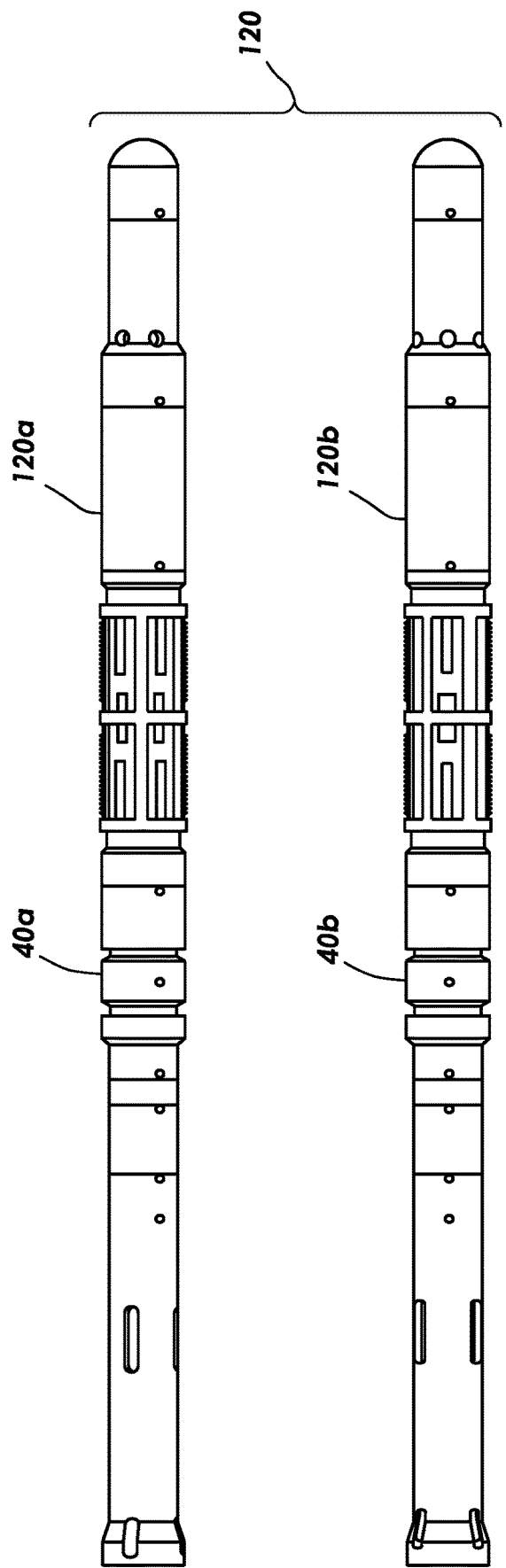
FIG. 2 is a side-by-side comparison of two different bridge plugs in a fleet of similar size, type and form factor but different tool ratings.

FIG. 2 is a side-by-side view of two service tools 120 in a fleet, embodied by way of example as two different bridge plugs 120a, 120b, of similar size, type, and form factor but different design and/or operating parameters. Each has a respective sealing element 40a, 40b. The tools 120 may be part of a fleet of tools each performing the same general tool function(s) but the different design and/or operating parameters are provided so that a specific tool may be selected from the fleet according to the expected operating parameters and requirements for a particular job. Outwardly, the two tools 120a, 120b have nearly identical physical appearance, yet may have significantly design and parameters and performance limits, such as different pressure and/or temperature ratings. For example, the first bridge plug 120a may be rated to 10,000 psi, while the second bridge plug 120b may be rated to 7,500 psi. The different ratings may be attributable at least to having different sealing elements 40a, 40b, just as an example. For example, the elastomeric sealing element 40a on the higher-rated tool 120a may be formed of a more durable and more expensive material than the elastomer of the sealing element 40b on the tool 120b with the lower pressure rating. Other components on the tools 120 may also differ even if not outwardly apparent.

FIG. 3 is a chart hypothetically relating the service lives of two example tools and their components based on different downhole parameters such as temperature, pressure, the presence or concentration of specific chemicals such as Chem1 and Chem2, flow rate, and so forth. Hypothetical numbers are provided for the first five columns 51-55. Column 51 shows how the tool service life of the first tool 120a may be affected by (in this case, decrease with) increasing temperature in column 55 (disregarding effects of other parameters or assuming those other parameters are unchanged). Column 52 shows how a component service life of the sealing element 40a may decrease with increasing temperature in column 55. Similarly, column 53 shows how the tool service life of the second tool 120b may decrease and how a component service life of the sealing element 40b may decrease with increasing temperature in column 55. In this example, the first tool 120a with the higher, 10,000 psi rating, and its sealing element 40a (FIG. 2) also fares better and lasts longer than the second tool (rated to 7,500 psi) and its sealing element. This may be because the tool with the higher pressure rating includes more robust components that also last longer at elevated temperature. The tool service life presumes that one or more specific components such as the elastomeric sealing elements may wear out and be replaced at least once during the service life of the tool. The component service life may be less than the overall tool service life for a given tool. As the chart shows, the tool and component service lives decrease with increasing temperature. The component service life may also decrease more rapidly at elevated temperatures than the respective tool life. Yet, the first tool 120a and respective sealing element 40a has a higher expected service life at any given temperature than the second tool 120b and sealing element 40b.

On a bridge plug, the elastomeric seals may be regarded as consumables. For instance, by design, the sealing element 40 of the bridge plug 120 of FIG. 2 may be replaced multiple times during the service life of the tool itself, for at least the reason that elastomers are relatively inexpensive compared to the total tool cost, and are more vulnerable to degradation downhole due to softer materials than the tool body and the high compressive forces applied. Other examples of consumables may include other elastomeric parts such as O-rings and other sealing members, tool centralizers or stabilizers on the exterior that may get dragged along a rough borehole, or internal battery packs that may supply power to on-board electronics. Such consumable components may wear out faster and need replacement more often when exceeding temperature and other design parameters that do not necessarily cause other components to fail. For example, a metallic tool body will generally be more durable and last longer than seals. As such, the component service life may decrease relative to a tool service life of the wellbore service tool in response to increasing values of the one or more downhole parameters.

Tool selection can therefore be important in terms of matching the capabilities of the tool to a given job. There may be trade-offs associated with tool selection. For example, the first tool 120a, by virtue of its higher pressure rating, may be more expensive, and yet capable of operating reliably at greater depths and greater temperatures, or may achieve a longer service life at a more shallow depth and temperature below that rating. The second tool 120b may be less expensive and the more cost-effective choice for certain jobs, such as for working in wells at depths that will be exposed to less than 7,500 psi. Another issue with managing such a fleet of tools is that care must be taken to keep track of the different tools and their ratings so that, for example, the second tool 120b is not inadvertently used at a depth of greater than 7,500. The diagnostic coating 12 as taught herein may be applied to either the body of the tool 120a or 120b or a specific component, such as the sealing element 40a, 40b. This diagnostic coating may be formulated to identify and distinguish the two tools 120a, 120b, and to visually indicate whether certain downhole parameters have been encountered or exceeded.

Figure 4:
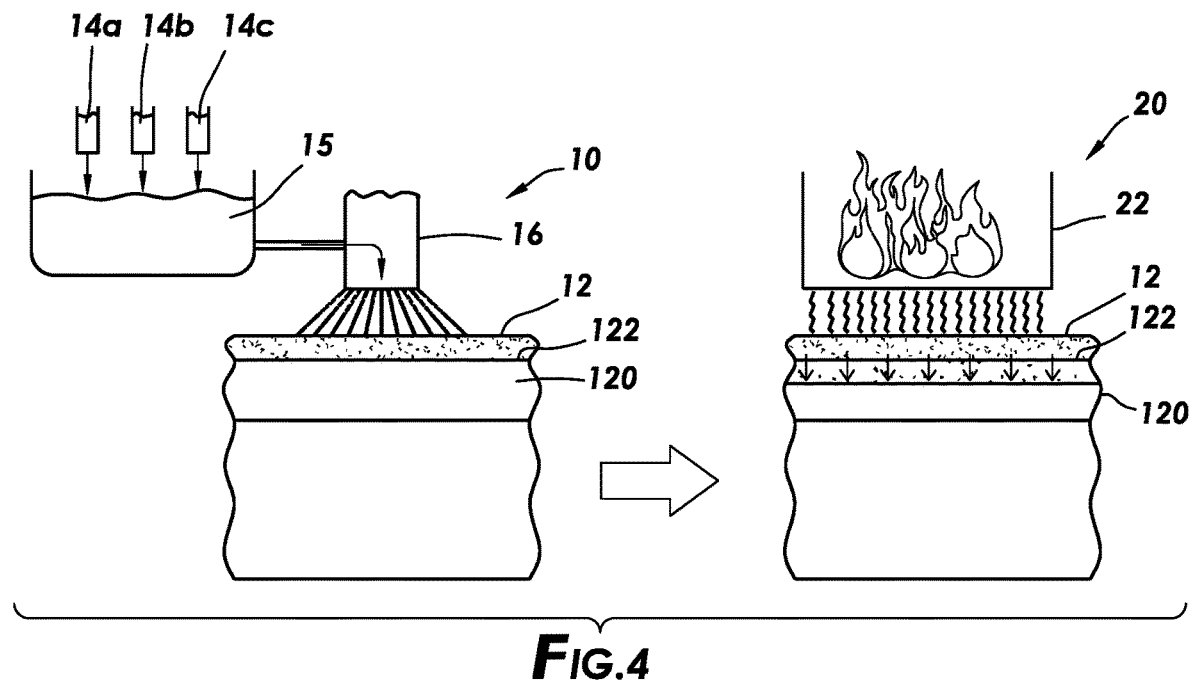
FIG. 4 is a schematic flow diagram of a diagnostic coating being formed on a surface of the tool according to an encapsulation stage and embedment stage.

FIG. 4 is a schematic flow diagram of a diagnostic coating 12 being formed on a surface 122 of the tool 120 in an encapsulation stage 10 and embedment stage 20 according to aspects of this disclosure. The portion of a surface coated with the diagnostic coating may be alternately referred to throughout as the diagnostic surface. In the encapsulation stage 10, the coating 12 in FIG. 4 is first applied to the surface 122. In the embedment stage 20, the coating 12 is then baked for a prescribed temperature and time period, optionally under pressure, to embed the coating 12 within the surface 122 for a more durable and lasting coating 12. The surface 122 may be an outer surface of the tool 120 that will be directly exposed to the downhole environment. The surface 122 may be on the tool body or portion thereof, or a specific component such as a seal for sealing with a wellbore. The surface 122 may alternatively be an enclosed surface of the tool, such as an interior seal or electronics package that is internal to the tool and not exposed directly to the downhole environment. Other surfaces, such as the surface of an external sealing element, may initially be exposed to the wellbore environment when tripping downhole, but after setting the tool to seal against the wellbore the elastomer may avoid exposure to chemical interactions and other attributes of the downhole environment.

In the encapsulation stage 10, a coating formulation 15 comprises one or more constituents 14 (individually referred to as 14a, 14b, 14c, etc.). At least one constituent 14 may be referred to as an active constituent that undergoes an optically-detectable change responsive to the one or more downhole parameter while the diagnostic coating 12 remains intact. One or more other constituent 14 may be inactive, i.e., providing some function or benefit, such as identification of a component, abrasion or chemical resistance. In one example, the coating may include a chemically resistant constituent that increases the component service life in the presence of a downhole chemical relative to the component service life without the chemically resistant constituent in the presence of the downhole chemical. The constituents 14 may be combined and applied via an applicator 16, such as a spray applicator.

After the coating 12 has dried, the tool 120 or component thereof may undergo the embedment stage 20, wherein it is placed in or passed through a heat source such as a furnace or oven 22 to bake the coating 12 for a prescribed temperature and time. This embedment stage 20 may further cure the coating 12 and embed the coating 12 or constituent(s) 14 thereof within the surface 122. As illustrated, the constituent(s) 14 may actually penetrate below the surface 122 during embedment, which promotes a more lasting and durable coating 12.

A particular coating formulation 15 may be selected for a seal that does not adversely affect sealing performance. For instance, a polytetrafluoroethylene (PTFE) coating may be applied with adhesion promoter by a water-soluble medium transfer. The coating 12 can be added in several coats, such as up to three layers during the encapsulation stage 12 and is thermally set by curing in the embedment stage 20. For certain applications or materials, such as for coating low-expansion elastomers of a bridge plug, the application temperature may be limited to 300 F (149 C). Experiments have shown the stretching of the rubber is within the elasticity of the coating 12 and may avoid issues of cracking, flaking, micro-fissures, and discoloration.

The coating 12 may include at least one active constituent 14 that may undergo thermochromic pigment alteration, to achieve a color change responsive to a particular temperature or temperature range. The coating 12 may be formulated with selected thermochromic constituents and amounts to respond to a target temperature range that is relevant to the performance or service life of the tool or component. This thermochromic pigment alteration constituent may include organic or inorganic materials which have a selective response to temperature.

Non-limiting examples of organic materials capable of thermochromic pigment alteration include organic or inorganic materials which have a selective response to temperature. include thermochromic liquid crystal, leuco dyes, and combinations of paper, polymer, and ink. Non-limiting examples of inorganic materials capable of thermochromic pigment alteration include cuprous mercury iodide, silver mercury iodide, chromium oxide, and vanadium dioxide.

In one example, bis(dimethylammonium) tetrachloronickelate (II) is a compound that may start out red and become blue around 230 F. In another example, chromium oxide mixed with aluminum oxide may start out red and turn gray at a selected ratio. Yet another example is copper(I) iodide, which may start out tan and turn orange at higher temperatures. Yet another example is ammonium metavandate, which may start out white and turn brown at 300 F and black at 350 F. The temperatures ranges at which the active constituents are most responsive to temperature may be related to some extent to the amount or concentration of that constituent or its combination with other constituents of the coating. Thus, the formulation of the coating 12, including the constituents 14, their amounts, and ratios with other constituents 14, may be tuned to be responsive to a particular temp range that is relevant to the performance of a given tool or component. In one example, the thermochromic constituent may be selected having increased sensitivity to an elevated temperature of at least 150 degrees F. (65.6 C). In another example, the thermochromic constituent may be selected having increased sensitivity to an elevated temperature range of between 250 degrees F. (121.1 C) and 350 degrees F. (176.7 C).

The coating 12 may also include any number of inactive constituents included for reasons other than thermochromic pigment alteration, such as to increase chemical and abrasion resistance, a low-friction modifier, inert or filler materials, and a carrier medium. Examples that may provide chemical and abrasion resistance includes thermoplastic/thermoset such as PTFE, fluorinated ethylene propylene (FEP), perfluoroalkoxy alkane (PFA), and polyoxymethylene such as Delrin®. Metallic materials such as brass/copper and aluminum bronze alloys may also be utilized. Examples of low friction modifiers may also include PTFE, FEP, PFA, and polyoxymethylene, as well as dry lubricants such as graphite, molybdenum disulfide, boron nitride, and tungsten disulfide. Examples of inert materials also include thermoplastic/thermoset such as PTFE, FEP, or PFA. A carrier medium may also be included to facilitate the coating process. Other constituents 14 of the coating 12 at least during application in the encapsulation stage 10 may include aerosol proppants such as chlorfluorocarbons, and inert gases such as nitrous oxide and carbon dioxide. Various adhesion promoters and water soluble medium transfer may also be included among the various constituents 14 of the coating 12 at least as applied to the surface 122.

Figure 5:
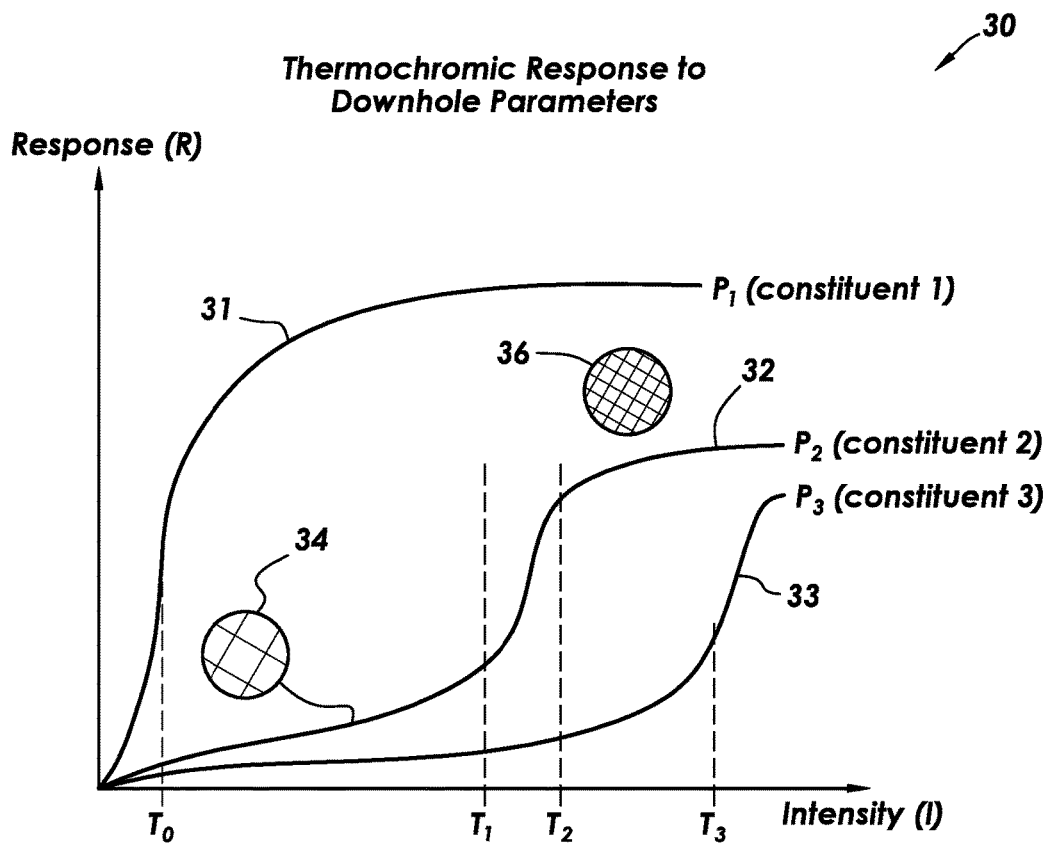
FIG. 5 is a graph relating the response of an active constituent of the coating to the intensities of different downhole parameters.

FIG. 5 is a graph 30 relating the response of an active constituent of the coating to the intensities (I) of different downhole parameters (P). Example parameters include temperature and concentration of a given chemical. Each example parameter $P_1$ to $P_3$ is represented by a respective curve 31, 32, 33 in the graph 30. For example, the middle curve 32 qualitatively relates the color change (vertical axis) responsive to parameter $P_2$ which is temperature in this case (horizontal axis) for a particular photochromic pigment formulation. The coating may be formulated so that the predominant color change occurs within a relatively narrow temperature range of $T_1$ to $T_2$ at respective inflection points along the curve. At temperatures below $T_1$ the color is relatively light as indicated at a sample point 34. The color response is fairly unresponsive to temperature below $T_1$ (shallow rise), and then dramatically changes color above $T_1$ (steep rise between $T_1$ and $T_2$) as indicated at another sample point 36. The formulation represented by this middle curve 32 may be used in identifying whether or not the tool has been exposed to temperatures above $T_1$. The coating could be alternatively formulated to have a more gradual color change responsive to temperature (more shallow rise between $T_1$ and $T_2$) to provide a visually-ascertainable approximation, based on the extent of color change, of where in a given temperature range the tool was subjected to.

Similarly, a formulation represented by the first curve 31 may be helpful in identifying whether or not the tool has been exposed to temperatures above a certain other temperature $T_0$ that is less than $T_1$. Likewise, a formulation represented by the third curve 33 may be used in identifying whether or not the tool has been exposed to temperatures above $T_3$ that is greater than $T_0$, $T_1$, and $T_2$. Similar curves could also be constructed to represent coating formulations targeting specific concentrations of specific chemicals.

Each of the respective coating formulations may be targeted to be most sensitive or responsive to temperatures above respective thresholds. In the example fleet of FIG. 2, the first coating formulation may be applied to the first sealing element 40a and the second coating formulation may be applied to the second sealing element 40b. The respective coatings may also be given different initial colors to help visually distinguish between the tools of the fleet before placing into service. For instance, a first coating formulation may be selected for a sealing element made of hydrogenated acrylonitrile butadiene rubber (HNBR), whose performance degrades rapidly when temperatures exceed the temperature $T_1$ (e.g. 300 F). Another coating formulation may be selected for a sealing element made of fluorocarbon (FKM) whose performance degrades rapidly when temperatures exceed $T_3$ (e.g. 400 F).

Figure 6:
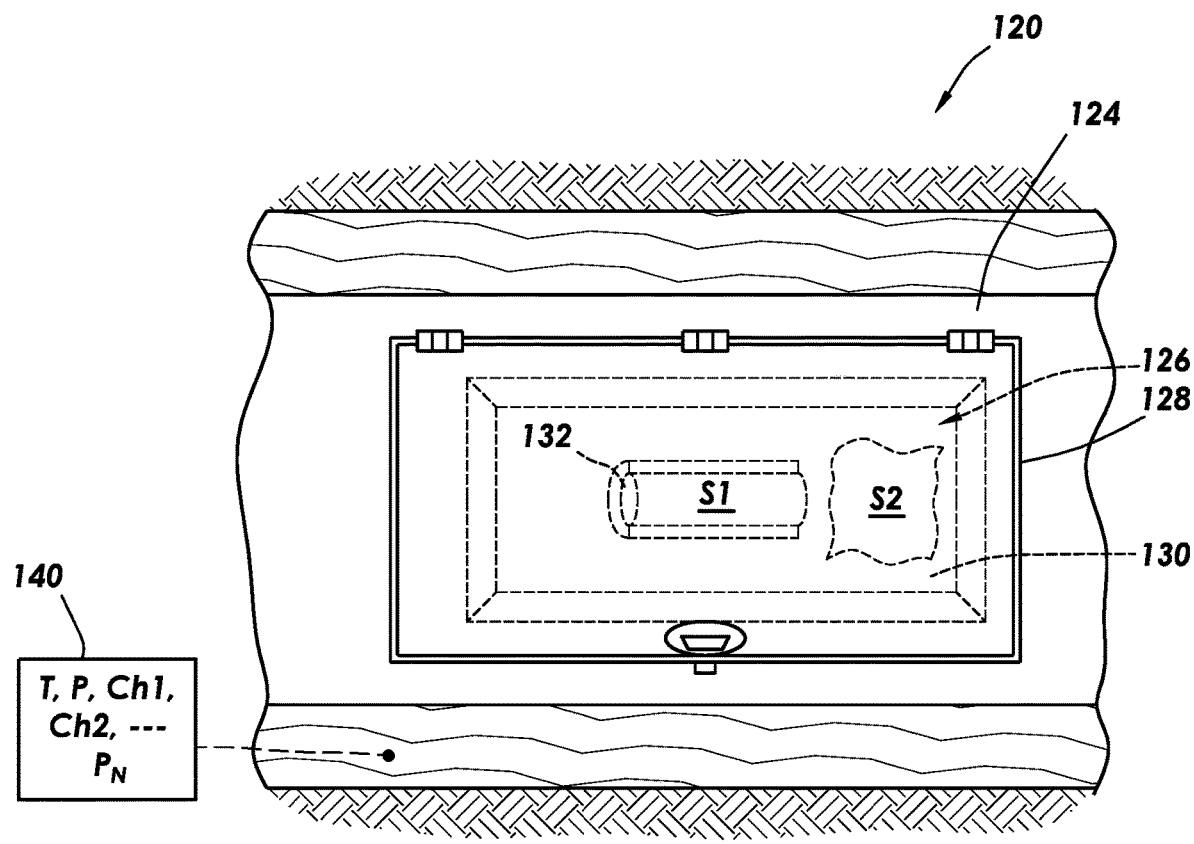
FIG. 6 is a schematic diagram of the tool wherein one or more diagnostic surface is enclosed within an internal tool cavity defined by the tool body.

FIG. 6 is a schematic diagram of the tool 120 in an embodiment wherein a diagnostic surface S1 and/or S2 is enclosed within an internal tool cavity 126 defined by the tool body 124. The coating 12 may be applied to an internal surface, such as a wall 130 of the tool cavity 126 to form the diagnostic surface S1 and/or to a diagnostic specimen 132 to form the diagnostic surface S2. A closure 128 may be provided, such as a removeable or hinged access hatch, to close the cavity 124 before the tool 120 is placed into service downhole and re-open the cavity 124 after the tool 120 is retrieved. The downhole environment may include wellbore fluids, pressure (P), temperature (T), one or more chemicals (Ch$_1$, Ch$_2$, etc.), and other downhole parameter $P_N$, as generally indicated at 140. The closed cavity 126 isolates the diagnostic surface $S_1$, $S_2$ from direct exposure to the wellbore environment, while still subjecting the surfaces $S_1$, $S_2$ at least to downhole temperature.

When the tool 120 is placed into service downhole, one or more constituent in the diagnostic coating undergoes an optically-detectable change responsive to one or more downhole parameters of the downhole environment, including at least a thermochromic constituent that changes color in response to the elevated downhole temperature. After performing a service operation downhole, the service tool 120 may be retrieved and the diagnostic surface S1, S2 inspected. The diagnostic surface is visually accessible when the tool is retrieved from the wellbore by opening the closure 128. For example, diagnostic surface S1 may be examined by opening the closure and looking inside, or retrieving the specimen 132 for inspection of the diagnostic surface S2.

Figure 7:
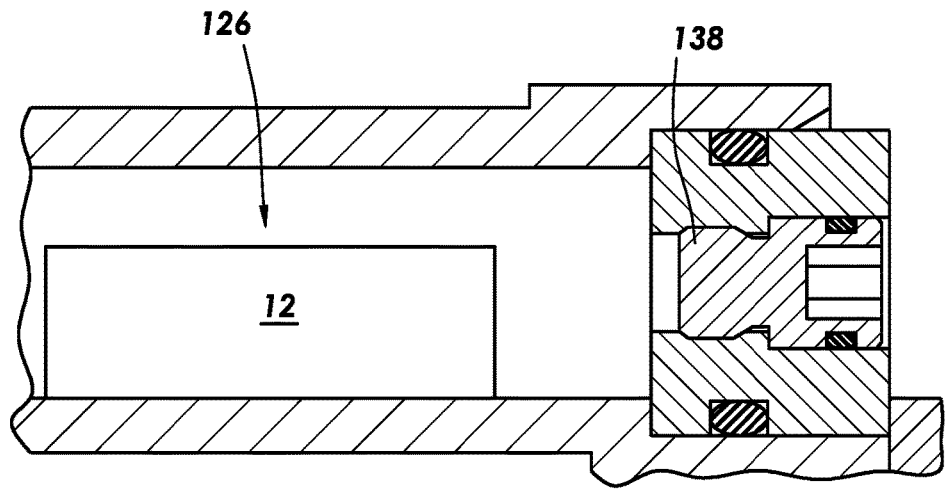
FIG. 7 is a schematic diagram of the tool in another embodiment illustrating various additional example locations for the diagnostic coating to be applied.

FIG. 7 is a schematic diagram of the tool 120 in another embodiment illustrating various additional example locations for the diagnostic coating to be applied. The tool body 124 here includes a version of the protective cavity 126 of FIG. 5 in which the diagnostic coating may be applied. The tool body 120 also includes another internal cavity portion 136 within the tool 120 that is also closed off from direct exposure to the downhole environment. The diagnostic coating may be applied to a component with the cavity portion 136, such as to the surface of a fastener 138.

Various methods are also within the scope of this disclosure, which may be performed, without limitation, using any of the example systems, devices or structures disclosed herein. In one method, a service tool is deployed into a wellbore having a downhole environment to service the wellbore. A diagnostic coating of the service tool is exposed to one or more downhole parameters of the downhole environment. The one or more downhole parameters include at least a downhole temperature. One or more constituent of the diagnostic coating undergoes a physical change responsive to elevated values of the one or more downhole parameters, including at least the elevated downhole temperature. The service tool may be subsequently retrieved from the wellbore and the diagnostic surface may be optically surveyed, either visually by a person or using an optical sensor of a machine, to detect any physical change indicative of the service tool having been exposed to elevated values of the one or more downhole parameters.

In one example, the diagnostic coating may be applied to a specimen, which may be removably enclosed within a sealed chamber of the tool prior to placing the tool in service. The specimen may later be removed from the sealed chamber after retrieving the tool from the wellbore to optically survey the diagnostic surface. The diagnostic coating may be alternatively applied to a functional tool component of the downhole tool assembled within the tool body, such as an internal fastener, isolated from the downhole tool environment. The functional tool component may later be removed from the service tool for inspection after the service tool is exposed to the downhole environment and then retrieved from the wellbore.

In another example method, a fleet of tools may be provided having at least two different tool configurations of the same type and form factor. The diagnostic coating may be applied to a surface of one of the tools but not applied to a corresponding surface of the other of the other tool. For example, the coating may be applied to one tool with a lower performance rating that is more susceptible than the other tool to a higher temperature or higher intensity of some other downhole parameter. That way, in case the lower-rated tool is mistaken for the higher-rated tool and used in a capacity that exceeds its design parameters, the diagnostic coating will allow the user to identify that the tool may have been compromised. In such a fleet, the different tools having the same or similar size, type, and form factor may also be painted a different color.

The systems and methods of the present disclosure may include any of the various features disclosed herein, in any viable combination, including but not limited to anything discussed above and any of the following statements.

Statement 1. A wellbore service tool, comprising: a consumable component having a component service life sensitive to affected by one or more downhole parameters of a downhole environment; a diagnostic coating applied to a diagnostic surface of the wellbore service tool, the diagnostic coating including one or more constituent that undergoes an optically-detectable change responsive to the one or more downhole parameters; and wherein the one or more downhole parameters comprises a downhole temperature, and wherein the one or more constituent comprises a thermochromic constituent that changes color in response to elevated values of the downhole temperature.

Statement 2. The wellbore service tool of Statement 1, wherein the thermochromic constituent has increased sensitivity to an elevated temperature of at least 150 degrees F. (65.6 C).

Statement 3. The wellbore service tool of Statement 1, wherein the thermochromic constituent has increased sensitivity to an elevated temperature range of between 250 degrees F. (121.1 C) and 350 degrees F. (176.7 C).

Statement 4. The wellbore service tool of any of the foregoing Statements, wherein the consumable component comprises a sealing element; wherein the component service life decreases in response to the elevated values of the downhole temperature; and wherein the sealing element also defines at least a portion of the diagnostic surface to which the diagnostic coating is applied.

Statement 5. The wellbore service tool of any of the foregoing Statements, wherein the component service life decreases relative to a tool service life of the wellbore service tool in response to increasing values of the one or more downhole parameters.

Statement 6. The wellbore service tool of any of the foregoing Statements, further comprising: a chemically resistant constituent that increases the component service life in the presence of a downhole chemical relative to the component service life without the chemically resistant constituent in the presence of the downhole chemical.

Statement 7. The wellbore service tool of any of the foregoing Statements, further comprising: a tool body defining an internal tool cavity containing the diagnostic surface to subject the diagnostic surface to the downhole temperature while isolating the diagnostic surface from the downhole environment.

Statement 8. The wellbore service tool of any of the foregoing Statements, wherein a wall of the tool cavity defines the diagnostic surface to which the diagnostic coating is applied.

Statement 9. The wellbore service tool of any of the foregoing Statements, further comprising a closure removably securable to the tool body for closing the tool cavity and subsequently opening the sealed tool cavity when the wellbore service tool is retrieved from the wellbore to access the diagnostic surface.

Statement 10. The wellbore service tool of any of the foregoing Statements, wherein the diagnostic coating further comprises one or more of a low-friction modifier, an abrasion-resistant material, an inert material, and a carrier medium.

Statement 11. The wellbore service tool of any of the foregoing Statements, wherein the diagnostic coating is embedded within the diagnostic surface prior to deploying the wellbore service tool downhole.

Statement 12. A wellbore service tool, comprising: a tool body including one or more tool components for servicing a well; a tool cavity within the tool body including a diagnostic surface within the tool cavity; a diagnostic coating applied to the diagnostic surface, wherein the diagnostic surface is subjected to at least an elevated downhole temperature without being exposed directly to a downhole environment external to the tool cavity; one or more constituent in the diagnostic coating that undergoes an optically-detectable change responsive to one or more downhole parameters of the downhole environment, including at least a thermochromic constituent that changes color in response to the elevated downhole temperature; and wherein the diagnostic surface is visually accessible when the tool is retrieved from the wellbore.

Statement 13. The wellbore service tool of Statement 12, further comprising: a specimen defining at least a portion of the diagnostic surface, with the diagnostic coating applied to at least the specimen; and wherein the tool cavity comprises a sealed chamber for removably enclosing the specimen.

Statement 14. The wellbore service tool of Statement 12 or 13, further comprising: a functional tool component of the downhole tool assembled within the tool body, wherein the cavity comprises one or more sealing elements that isolate the functional tool component from the downhole tool environment, the functional tool component defining the diagnostic surface; and wherein the functional tool component is removable from the service tool for inspection after the service tool is exposed to the downhole environment and then retrieved from the wellbore.

Statement 15. The wellbore service tool of any of Statements 12 to 14, wherein the functional tool component is a consumable component having a component service life of less than a tool service life of the wellbore service tool, wherein the component service life decreases in response to one or more downhole parameters of a downhole environment.

Statement 16. A method comprising: deploying a service tool into a wellbore having a downhole environment and servicing the wellbore; exposing a diagnostic coating of the service tool to one or more downhole parameters of the downhole environment, the one or more downhole parameters including at least a downhole temperature, wherein one or more constituent of the diagnostic coating undergoes a physical change responsive to elevated values of the one or more downhole parameters; retrieving the service tool from the wellbore; and inspecting the diagnostic surface to detect any physical change indicative of the service tool having been exposed to elevated values of the one or more downhole parameters.

Statement 17. The method of Statement 16, further comprising: providing a fleet of tools having at least two different tool configurations of the same type and form factor, wherein the service tool is designated by one but not the other of the at least two different tool configurations; and omitting the diagnostic coating from the other of the at least two different tool configurations.

Statement 18. The method of Statement 16 or 17, further comprising: the service tool includes a consumable component having a component service life, wherein the component service life decreases in response to elevated values of one or more downhole parameters of a downhole environment; and wherein tools within the fleet having the other of the at least two different tool configurations have a longer component service life in response to identical elevated values of the one or more downhole parameters of a downhole environment.

Statement 19. The method of Statement 16, further comprising: providing the diagnostic coating on a specimen; removably enclosing the specimen within a sealed chamber; and removing the specimen from the sealed chamber after retrieving the service tool from the wellbore to optically survey the diagnostic coating.

Statement 20. The method of any of Statements 16 to 19, further comprising: providing the diagnostic coating on a functional tool component of the downhole service tool assembled within the tool body and isolated from the downhole tool environment; and removing the functional tool component from the service tool for inspection after the service tool is exposed to the downhole environment and then retrieved from the wellbore.

Although individual examples may be discussed herein, the present disclosure covers all combinations of the disclosed examples, including, without limitation, the different component combinations, method step combinations, and properties of the system. Also, for the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A wellbore service tool, comprising:
    a consumable component having a component service life affected by one or more downhole parameters of a downhole environment, wherein the consumable component comprises a sealing element and wherein the component service life decreases in response to the elevated values of the downhole temperature;
    a diagnostic coating applied to a diagnostic surface of the wellbore service tool wherein the sealing element defines at least a portion of the diagnostic surface to which the diagnostic coating is applied, the diagnostic coating including one or more constituents that undergo an optically-detectable change responsive to the one or more downhole parameters; and
    wherein the one or more downhole parameters comprise a downhole temperature, and wherein the one or more constituents comprise a thermochromic constituent that changes color in response to elevated values of the downhole temperature.

2. The wellbore service tool of claim 1, wherein the thermochromic constituent has increased sensitivity to an elevated temperature of at least 150 degrees F. (65.6 C).

3. The wellbore service tool of claim 1, wherein the thermochromic constituent has increased sensitivity to an elevated temperature range of between 250 degrees F. (121.1 C) and 350 degrees F. (176.7 C).

4. The wellbore service tool of claim 1, further comprising:
    a tool body defining a tool cavity containing another portion of the diagnostic surface to subject the another portion of the diagnostic surface to the downhole temperature while isolating the another portion of diagnostic surface from the downhole environment.

5. The wellbore service tool of claim 4, wherein a wall of the tool cavity defines the another portion of the diagnostic surface to which the diagnostic coating is applied.

6. The wellbore service tool of claim 4, further comprising a closure removably securable to the tool body for closing the tool cavity and subsequently opening the tool cavity to access the another portion of the diagnostic surface.

7. The wellbore service tool of claim 1, wherein the diagnostic coating further comprises one or more of a low-friction modifier, an abrasion-resistant material, an inert material, or a carrier medium.

8. The wellbore service tool of claim 1, wherein the diagnostic coating is embedded within the diagnostic surface.

9. A wellbore service tool, comprising:
    a consumable component having a component service life that decreases relative to a tool service life of the wellbore service tool in response to increasing values of one or more downhole parameters of a downhole environment comprising a downhole temperature;
    a diagnostic coating applied to a diagnostic surface of the wellbore service tool, the diagnostic coating including one or more constituents that undergo an optically-detectable change responsive to the one or more downhole parameters, including a thermochromic constituent that changes color in response to elevated values of the downhole temperature; and
    a chemically resistant constituent that increases the component service life in the presence of a downhole chemical relative to the component service life without the chemically resistant constituent in the presence of the downhole chemical.

10. The wellbore service tool of claim 9, wherein the thermochromic constituent has increased sensitivity to an elevated temperature of at least 150 degrees F. (65.6 C).

11. The wellbore service tool of claim 9, wherein the thermochromic constituent has increased sensitivity to an elevated temperature range of between 250 degrees F. (121.1 C) and 350 degrees F. (176.7 C).

12. The wellbore service tool of claim 9, wherein the diagnostic coating further comprises one or more of a low-friction modifier, an abrasion-resistant material, an inert material, or a carrier medium.

13. The wellbore service tool of claim 9, wherein the diagnostic coating is embedded within the diagnostic surface.

14. The wellbore service tool of claim 9, further comprising:
a tool body defining a tool cavity containing another portion of the diagnostic surface to subject the another portion of the diagnostic surface to the downhole temperature while isolating the another portion of diagnostic surface from the downhole environment.

15. The wellbore service tool of claim 14, wherein a wall of the tool cavity defines the another portion of the diagnostic surface to which the diagnostic coating is applied.

16. The wellbore service tool of claim 14, further comprising a closure removably securable to the tool body for closing the tool cavity and subsequently opening the tool cavity to access the another portion of the diagnostic surface.

17. A method, comprising:
providing a fleet of tools having at least two different tool configurations of the same type and form factor;
deploying a service tool into a wellbore having a downhole environment and servicing the wellbore, wherein the service tool is designated by one but not the other of the at least two different tool configurations;
exposing a diagnostic coating of the service tool to one or more downhole parameters of the downhole environment, the one or more downhole parameters including at least a downhole temperature, wherein one or more constituents of the diagnostic coating undergo a physical change responsive to elevated values of the one or more downhole parameters;
omitting the diagnostic coating from the other of the at least two different tool configurations;
retrieving the service tool from the wellbore; and
inspecting the diagnostic surface to detect any physical change indicative of the service tool having been exposed to elevated values of the one or more downhole parameters.

18. The method of claim 17, further comprising:
the service tool includes a consumable component having a component service life, wherein the component service life decreases in response to elevated values of one or more downhole parameters of a downhole environment; and
wherein tools within the fleet having the other of the at least two different tool configurations have a longer component service life in response to identical elevated values of the one or more downhole parameters of a downhole environment.

19. The method of claim 17, further comprising:
providing the diagnostic coating on a specimen;
removably enclosing the specimen within a sealed chamber; and
removing the specimen from the sealed chamber after retrieving the service tool from the wellbore to optically survey the diagnostic coating.

20. The method of claim 17, further comprising:
providing the diagnostic coating on a functional tool component of the service tool assembled within the tool body and isolated from the downhole tool environment; and
removing the functional tool component from the service tool for inspection after the service tool is exposed to the downhole environment and then retrieved from the wellbore.

* * * * *